UNITED STATES PATENT OFFICE.

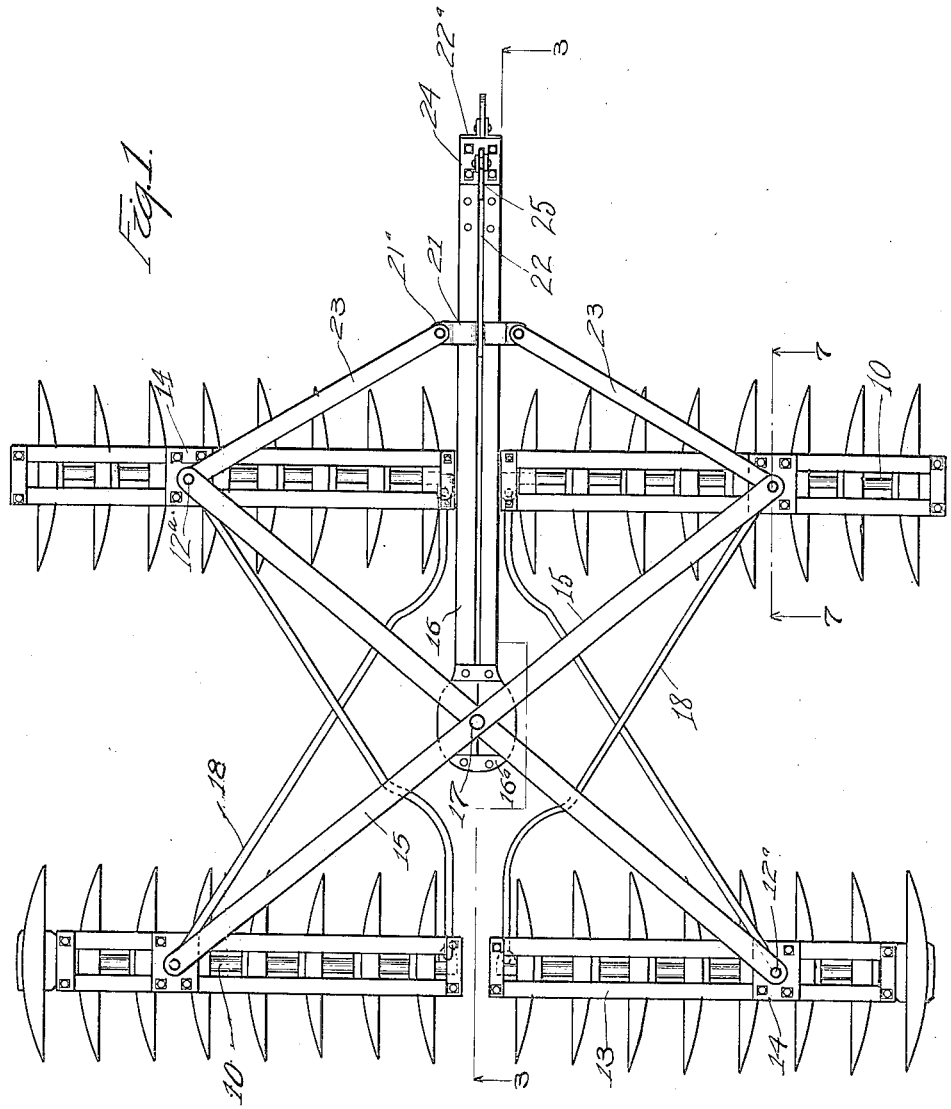

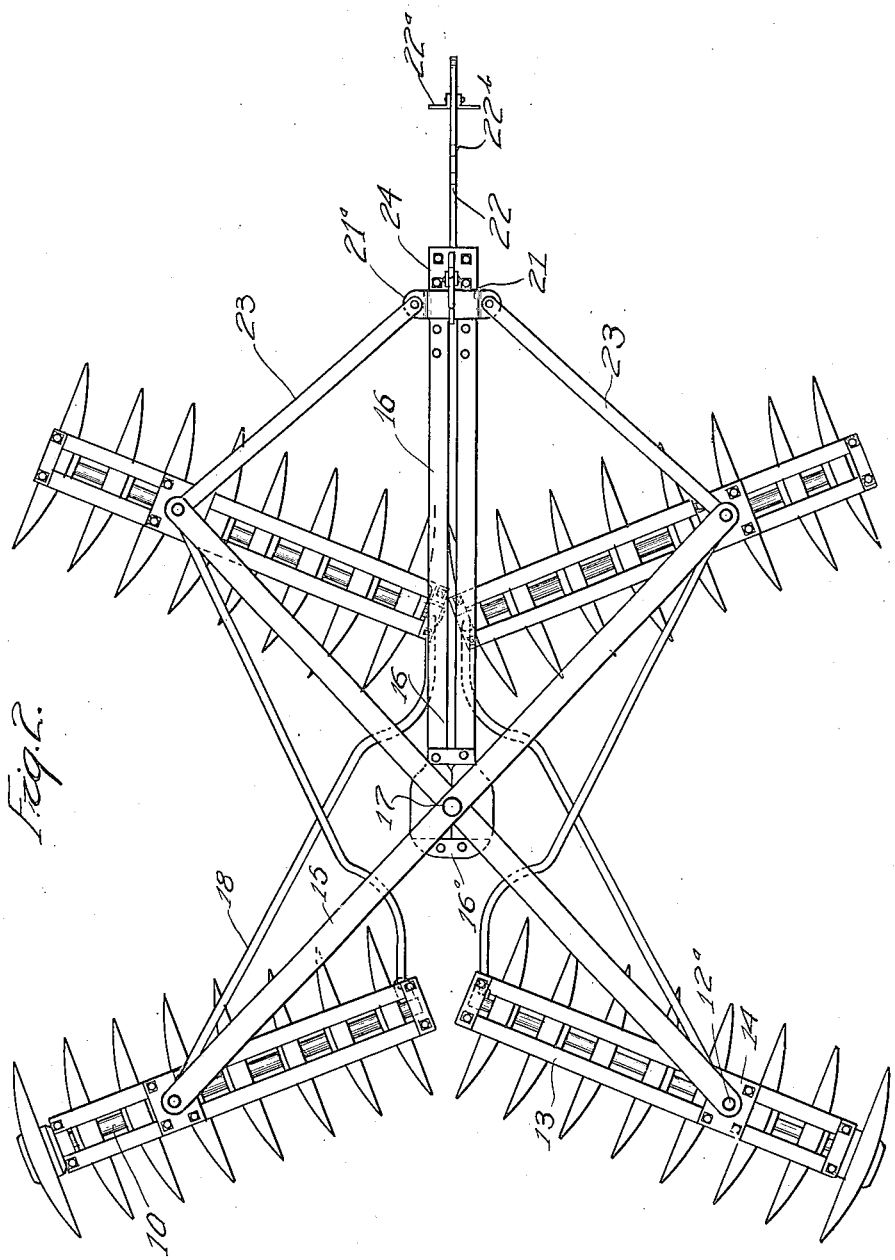

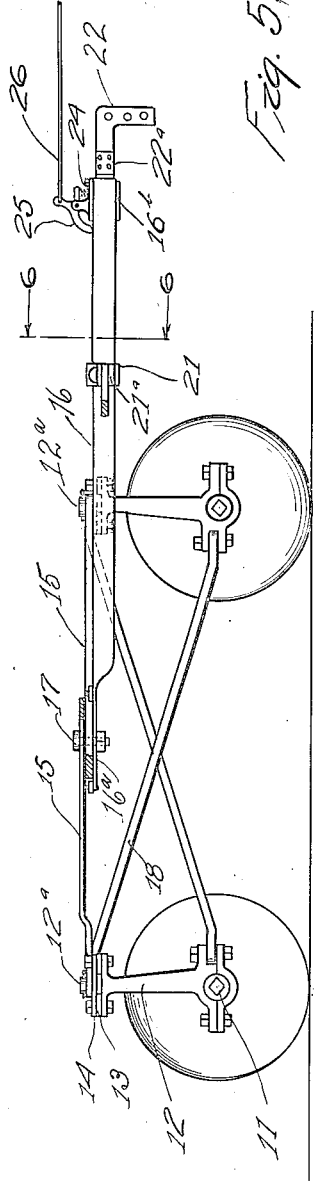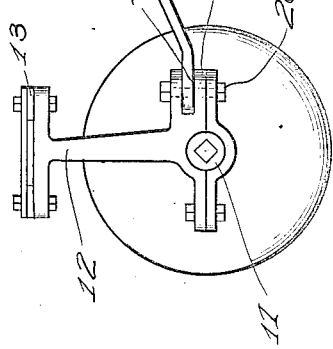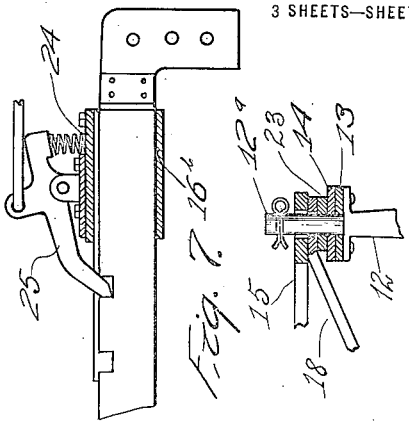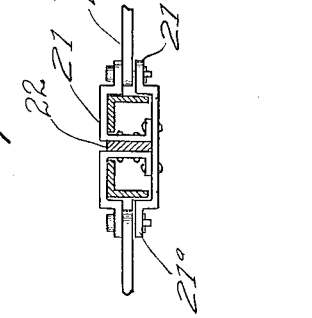

VICTOR F. LASSAGNE, OF CHICAGO, ILLINOIS.

TRACTOR DISK HARROW.

1,402,236. Specification of Letters Patent. Patented Jan. 3, 1922.

Application filed May 7, 1920. Serial No. 379,650.

*To all whom it may concern:*

Be it known that I, VICTOR F. LASSAGNE, a citizen of the United States, residing at Chicago, in the county of Cook and State of Illinois, have invented certain new and useful Improvements in Tractor Disk Harrows, of which the following is a full, clear, and exact specification.

My invention relates to earth-working implements of the multiple gang type and more specifically to the so-called tractor or engine harrows in which angular adjustment of the implement gangs, usually disks, is effected through the draft of the tractor.

The objects of the invention are to provide a simplified and inexpensive construction for a harrow of above type, while retaining the advantages of quick and positive response of the gang angling mechanism to the pull or push of the tractor and the degree of flexibility of the harrow structure necessary to enable the gangs to follow inequalities in the field.

I attain these objects by connecting implement sets such as disk gangs to a novel form of frame, the members of which are connected for relative movement and by so connecting the elements of the frame to each other and to the gangs as to cause angular movement of the gangs when the frame members are moved relatively to each other.

In the particular form I here disclose, pivotally connected crossed frame bars are employed, on the ends of which four disk gangs are pivotally mounted. Each end of each frame bar has a link connection with the inner end of the gang ahead or behind it and it necessarily follows that swinging or "scissor" movement of the main bars will cause angular movement of the gangs. The swinging of the frame bars is preferably effected by the draft of the tractor.

With these main and other minor objects in view, my invention consists of the organization, details of construction and parts, or their equivalents hereinafter described and claimed.

Having reference to the drawings:

Fig. 1 is a plan view of a disk harrow embodying my invention, showing the gangs straightened.

Fig. 2 is a similar view with the gangs in angled or working position.

Fig. 3 is a longitudinal vertical section taken on line 3—3 Fig. 1.

Fig. 4 is a detail view of one of the inner standards and bearing brackets.

Fig. 5 is a detail of the forward end of the draft bar and latch.

Fig. 6 is a sectional detail on line 6—6, Fig. 3.

Fig. 7 is a sectional detail on line 7—7, Fig. 1.

In the present embodiment of my invention, four disk gangs of ordinary type are employed arranged as front and rear pairs. Each gang consists of a disk carrying shaft 10 journaled in bearings 11 on standards 12. There are two standards to each gang, one at the inner end of the gang and another at some point in the outer third of the length of the gang. These standards have flanges secured to gang frame bars 13 which may consist of parallel members connected at their ends as illustrated. Secured to these members above each outer standard 12 is an apertured plate 14 through which a vertical extension or pintle $12^a$ on the top of the standard projects.

The gang connecting structure or frame of the harrow consists of the main frame members 15 arranged in crucial form and pivotally connected at their middles to each other and to a forwardly extending draft frame 16 by a pintle or bolt 17, while their outer ends are pivotally mounted on the pintle $12^a$ on each gang frame. Each pintle $12^a$ also has pivoted to it one end of a gang swinging or angling rod or link 18 and on each side of the harrow these rods cross each other and have their other ends pivotally connected to the inner ends of the respective gangs forming that lateral half of the harrow, that is, the link 18 connected to the pintle $12^a$ on the front gang frame extends diagonally downward and is connected to the inner end of the rear gang on the same side and vice versa. These links are shaped to avoid interference with the end disks of the gangs and with each other and their pivotal connection to the inner ends of the gangs may consist of the lugs 19 on the standards 12 between which their flattened apertured ends $18^a$ are received. The pin or bolt 20 serving as pivot and also as a securing element for the bearing box.

The draft frame 16 is preferably composed of spaced parallel angle iron bars formed with flattened and rigidly connected rear ends constituting the pivot plate $16^a$ which carries the pivot 17 for the crossed members 15. The forward end of draft frame 16 may be supported on an ordinary tongue truck if desired.

It will be evident from the structure and arrangement of parts so far described that the relation of bars 15 to links 18, and of both to the gang frames, results in what may be termed a lazy-tong construction and that any movement given the intersecting bars 15 on each other will cause corresponding movement to be communicated to the disk gangs through intersecting links 18 which form flexible connections between the bars and gangs. As will be obvious to those skilled in the art, a number of devices for applying power to move bars 15 could be used and as an example of one such device, I have shown a sliding head 21 mounted to travel on the angle bars of frame 16 and having a forwardly extending draft member or plate 22 rigidly secured to it and positioned in the space between the angle bars of frame 16 with its upper edge substantially even with the tops of the bars. A cross-piece 16$^b$ is secured below frame 16 on which the lower edge of the draft plate 22 rides and the draft plate carries a stop 22$^a$ which limits its inward movement through contact with the end of frame 16. The head 21 is formed with a pair of horizontal lugs 21$^a$ on each side and a link 23 pivotally connects each pair of lugs with the pintles 12$^a$ on the front gangs. On the forward end of frame 16 there is mounted a latch supporting plate 24, which is preferably adjustable longitudinally thereon and which acts as a stop to outward movement of the sliding draft head 21. This plate carries a pivoted latch such as 25 which is spring pressed against the upper edge of draft member 22 and which has a flexible member or rope 26 adapted, when pulled, to raise the latch out of contact with the draft member against the pressure of the latch spring. The upper edge of draft member or plate 22 is formed with spaced notches 22$^b$ so placed that the nose of latch 25 will seat in one of them when the draft member and draft head are pushed back to the limit of movement, that is, when stop 22$^a$ meets the end of frame 16, as in Figs. 1 and 3. The adjusted position of latch plate 24 on frame 16 determines which notch 22$^b$ is engaged by the latch and when latch 25 engages a notch the draft member 22 and parts connected to it are locked against outward movement, while the position of plate 24 on frame 16 fixes the limit of outward movement of the draft member 22 and draft head 21 when the latch has been released and the draft member is drawn out.

In operation it is assumed that the harrow is being drawn by a tractor and that rope 26 is in reach of the driver. When the gangs are in straight or non-working position, as in Fig. 1, a pull of the rope will release latch 25 from its notch in draft member 22 and the draft of the tractor will move it and head 21 and the links 23 outwardly on frame 16. As the links 23 are connected to the forward ends of crossed members 15 through pintles 12$^a$, these ends will be pulled toward each other and the members caused to swing on their pivot 17, and links 18 will consequently pull on the inner ends of the front and rear disk gangs. This will cause the inner ends of the gangs to swing toward each other until head 21 comes in contact with plate 24 and the position of the gangs, etc., seen in Fig. 2 is attained. The adjusted position of plate 24 on frame 16 determines the degree to which the gangs will be angled. To straighten the gangs, the tractor is backed a few feet causing a reversal of the action just described until stops 22$^a$ engage frame 16 and latch 25 drops into a notch 22$^b$ when the gangs will be straightened and locked in position and forward movement with the gangs in that position can be resumed.

In a structure such as above described, there is sufficient flexibility to permit the sections of the harrow to follow uneven ground as the several pivot connections may be left loose and the pintles 12$^a$ made long enough to allow some extent of vertical play for the gangs. The lazy-tong arrangement of the frame elements assures transmission of the draft power with the minimum of friction and therefore there is quick response to the gang angling and straightening movements of the tractor. Moreover, the front and rear pairs of gangs approach each other while angling and no unworked strip is left between the gangs.

The construction above described exemplifies one form of the invention and variations from said construction are contemplated within the scope of the appended claims.

I claim as my invention:

1. In an earth-working implement, the combination of relatively movable intersecting bars, gang frames loosely connected near their outer ends to the bars, and means connecting the bars and frames through which the frames are moved on their connections to the bars when the bars are moved relatively to each other.

2. In an earth-working implement, the combination of relatively movable intersecting bars, gang frames loosely connected near their outer ends to the bars, and means connecting each bar with the inner end of a frame on the other bar so that relative movement of the bars causes movement of the frames relatively to the bars.

3. In an earth-working implement, the combination of pivotally connected intersecting bars, gang frames pivoted to the bars, a link connecting each bar with the inner end of a frame on the other bar, and means for swinging the bars on their connection.

4. In an earth-working implement, the combination of pivotally connected intersecting frame bars, tool sets pivoted to each end of each member, a flexible connection between each end of each member and one end of a tool set on the other member, and means for swinging the frame bars on their connection.

5. The combination of claim 4, the means for swinging the frame members including a movable draft member and flexible connecting means between the draft member and one end of each frame member.

6. In an earth-working implement, the combination of pivotally connected intersecting frame members, an aligned gang of earth working tools pivoted to the ends of each member with the pivot in a plane with the longitudinal axis of the gang, a flexible connection between each member and a tool gang on the other member, and means for swinging the frame members on their connection.

7. In an earth-working implement, the combination of centrally pivoted intersecting frame members of equal length, an aligned gang of earth-working tools pivoted to each end of each member with the pivot in a plane with the longitudinal axis of the gang, a flexible connection between each end of each member and one end of a gang on the other member, and means for swinging the frame members on their pivot.

8. The combination of claim 7, the means for swinging the frame members comprising a forwardly extending draft frame on which the frame members are pivoted, a draft bar longitudinally movable on the draft frame, means for locking the draft bar to the draft frame, and pivoted links between the draft bar and one end of the frame members.

9. In an earth-working implement, the combination of pivotally connected intersecting frame members, disk gangs on the ends of the members, and means for swinging the members on their pivot to change the relative position of the gangs including a draft frame on which the members are pivoted and an adjusting member to which they are connected.

10. In an earth-working implement, the combination of front and rear pairs of pivoted disk gangs, pivotally connected intersecting members respectively connecting one front gang to one offset rear gang, a flexible link connection between each end of each frame member and one end of a gang on the other member, and means for swinging the frame members on their pivot thereby swinging the gangs.

11. In an earth-working implement, the combination with front and rear pairs of pivotally mounted disk gangs, of relatively movable members pivotally connecting the gangs including means for simultaneously swinging all the gangs on their pivots and moving the gangs of each pair towards or from each other in the direction of their axes when the connecting members are given relative movement.

12. In a disk harrow, a pair of pivotally connected crossed bars, a gang of disks pivoted on one end of each bar, a link pivotally connecting the other end of each bar to one end of the gang on the other bar, and means for moving the ends of the bars towards and from each other.

13. In an earth working implement, a frame comprising pivotally connected crossed members, tillage tools connected to the members, and means for moving the members to adjust the tools.

In testimony whereof I affix my signature.

VICTOR F. LASSAGNE.